(12) United States Patent
Hakbijl et al.

(10) Patent No.: US 9,404,689 B2
(45) Date of Patent: Aug. 2, 2016

(54) HEAT EXCHANGE MATRIX

(71) Applicants: Mark Hakbijl, Zwolle (NL); Johannes Antonius Maria Reinders, Warnsveld (NL)

(72) Inventors: Mark Hakbijl, Zwolle (NL); Johannes Antonius Maria Reinders, Warnsveld (NL)

(73) Assignee: OXYCOM BEHEER B.V., Raalte (NL)

( * ) Notice: Subject to any disclaimer, the term of this patent is extended or adjusted under 35 U.S.C. 154(b) by 259 days.

(21) Appl. No.: 14/359,674

(22) PCT Filed: Nov. 21, 2012

(86) PCT No.: PCT/NL2012/050830
§ 371 (c)(1),
(2) Date: May 21, 2014

(87) PCT Pub. No.: WO2013/095105
PCT Pub. Date: Jun. 27, 2013

(65) Prior Publication Data
US 2014/0352345 A1 Dec. 4, 2014

(30) Foreign Application Priority Data
Nov. 21, 2011 (NL) .................................... 2007827

(51) Int. Cl.
*F28C 3/08* (2006.01)
*B23P 15/26* (2006.01)
(Continued)

(52) U.S. Cl.
CPC . *F28C 3/08* (2013.01); *B01J 19/32* (2013.01); *B21D 13/00* (2013.01); *B21D 53/04* (2013.01); *B23P 15/26* (2013.01); *F24F 3/14* (2013.01); *F24F 6/02* (2013.01); *F28D 19/042* (2013.01); *B01J 2219/3221* (2013.01);
(Continued)

(58) Field of Classification Search
CPC ........... B21D 53/04; B21D 13/00; F24F 3/14; F24F 6/02; F24F 2203/10; F28D 19/042; B23P 15/26; F28C 3/08; B01J 19/32; B01J 2219/32268; B01J 2219/32206; B01J 2219/3221; B01J 2219/32251; Y10T 29/49359; Y02B 30/542
USPC ........................................ 62/314; 22/890.035
See application file for complete search history.

(56) References Cited

U.S. PATENT DOCUMENTS 2,607,437 A * 8/1952 Crawford ................. F24F 3/14
55/313
3,395,903 A 8/1968 Gunnar et al.
(Continued)

FOREIGN PATENT DOCUMENTS

GB 1158766 A 7/1969
WO 2007/026023 A1 3/2007

OTHER PUBLICATIONS

International Search Report, dated Apr. 3, 2013, from corresponding PCT application.

*Primary Examiner* — Mohammad M Ali
(74) *Attorney, Agent, or Firm* — Young & Thompson

(57) ABSTRACT

A heat exchange matrix includes a plurality of generally planar foils including a water retaining material, arranged in spaced, substantially parallel relationship. Each foil defines a main plane having a flow direction and a transverse direction and the foils include strips that extend a strip length in the transverse direction and are separated from each neighboring strip in the flow direction and each strip is offset from the main plane by a distance that is different from that of its neighbor. The matrix may be provided in a flow channel for air to be humidified and cooled.

21 Claims, 5 Drawing Sheets

(51) Int. Cl.
*F24F 6/02* (2006.01)
*B01J 19/32* (2006.01)
*B21D 53/04* (2006.01)
*F24F 3/14* (2006.01)
*F28D 19/04* (2006.01)
*B21D 13/00* (2006.01)

(52) U.S. Cl.
CPC ............... *B01J 2219/32206* (2013.01); *B01J 2219/32251* (2013.01); *B01J 2219/32262* (2013.01); *B01J 2219/32268* (2013.01); *F24F 2203/10* (2013.01); *Y02B 30/542* (2013.01); *Y10T 29/49359* (2015.01)

(56) References Cited

U.S. PATENT DOCUMENTS

| | | | |
|---|---|---|---|
| 3,652,066 A | 3/1972 | Faigle | |
| 3,733,063 A | 5/1973 | Loetel et al. | |
| 3,792,841 A | 2/1974 | Munters | |
| 4,147,210 A | 4/1979 | Pronke et al. | |
| 4,172,164 A * | 10/1979 | Meyer | F24F 3/1423 165/10 |
| 4,276,242 A | 6/1981 | Chen et al. | |
| 4,769,053 A | 9/1988 | Fischer, Jr. | |
| 5,143,658 A | 9/1992 | Thomas | |
| 5,204,027 A | 4/1993 | Armstrong et al. | |
| 5,474,832 A | 12/1995 | Massey | |
| 5,542,968 A | 8/1996 | Belding et al. | |
| 5,749,230 A * | 5/1998 | Coellner | F24F 3/14 62/271 |
| 7,415,837 B2 * | 8/2008 | Reinders | F24F 5/0035 62/304 |
| 7,775,064 B2 * | 8/2010 | Reinders | F24F 5/0035 62/310 |
| 2009/0007584 A1 | 1/2009 | Reinders | |
| 2009/0288812 A1 * | 11/2009 | Feng | B21D 53/04 165/166 |
| 2011/0079024 A1 | 4/2011 | Hakbijl et al. | |
| 2011/0120685 A1 | 5/2011 | Van Heeswijk et al. | |

* cited by examiner

HEAT EXCHANGE MATRIX

BACKGROUND OF THE INVENTION

1. Field of the Invention

The present invention relates to a heat exchange matrix of the type that can be used as an adiabatic humidifier to introduce moisture to a flow of fluid. The invention further relates to methods of manufacturing such devices. A matrix of this type can operate to provide adiabatic cooling for domestic purposes and may also be used for humidification in combination with conventional air conditioning and heating systems. It may also be used to remove moisture from an airstream in combination with a suitable desiccant.

2. Description of the Related Art

Heat exchange devices of one form or another are present in virtually every device and process. The performance of an action invariably involves the release of energy in the form of heat. If not required, the heat will often be released to ambient via an appropriate heat conducting surface provided e.g. with cooling fins. If the quantity of heat is excessive or if it can be employed for useful purposes, a specific heat exchanger may be provided to transport the heat away e.g. to another system. Heat exchange may also take place between different media:—gas, liquid and solid media can be interfaced in all combinations according to the performance required.

Adiabatic systems are also known, which act by evaporation of a liquid, usually water, into an air stream. Such systems are not heat-exchangers in the strictest sense, since they do not primarily cause heat to enter or exit the system. In fact, they serve to merely change the temperature of the air stream while raising its enthalpy only by the sensible heat of the added water. As water evaporates into the air stream, the latent heat of evaporation of this water is provided by the cooling of the air stream. For relatively hot, dry air, this method of cooling can be very efficient.

Conventional adiabatic coolers are disclosed in U.S. Pat. No. 3,792,841 and U.S. Pat. No. 5,143,658. Such devices generally comprise a matrix formed by stacks of corrugated plates placed on top of each other such that the corrugations in adjacent layers are angled with respect to one another. The plates may be formed of various materials but resin reinforced organic or inorganic fibrous materials are the most common. The plates are supported by a housing or frame which may provide inlet and outlet connections to guide an air flow through the stack. A watering arrangement is provided for continuously or intermittently applying water or another evaporable liquid to the plates. In operation, air to be cooled is passed through the stack. Assuming that the air is not fully saturated, it will absorb water vapour from the plates. In doing so, the temperature of the air is lowered, toward the so-called wet bulb temperature, which is the theoretical minimum. For given operating conditions, the efficiency of such devices may be determined by the input energy required to drive the air stream through the stack. This is in fact the only significant external energy required and is largely determined by the overall flow resistance of the stack and the speed of the air stream. A major problem with prior art devices is that in order to optimise efficiency they tend to become relatively voluminous.

In addition to adiabatic cooling, devices of similar construction are also used to humidify airstreams for other purposes. In particular, in integrated heating, ventilation and air conditioning systems (HVAC) it is often desirable to increase the absolute humidity of the air for comfort purposes. In particular during the winter months, heating systems tend to cause the air to become relatively dry. This may lead to respiratory problems, static electricity and other discomforts. Addition of moisture in an efficient manner without increasing the volume of the HVAC installation would be desirable.

An important distinction of the above devices over conventional heat exchangers is that they may interact with only one media flow. This avoids complex inlet and outlet manifolds and there is generally little need to consider the thermal conductivity of the matrix. Conventional air to air heat exchangers operate in cross-flow or counter-flow with heat transfer taking place between primary channels and secondary channels, which must be sealed from one another e.g. by heat conducting walls. An important design consideration is the manner in which an adequate heat transfer coefficient is achieved for the conducting walls. Another consideration is how multiple interlaced channels connect to inlet and outlet manifolds.

Another class of heat exchangers is the heat recovery wheel. Such devices use sensible and latent heat exchange media in the form of a matrix that provides air passages through which an air stream can be directed using a fan or blower. The matrices support a desiccant material that can absorb moisture and can take a variety of forms, such as a fibrous mesh or honeycomb. One type of honeycomb matrix is formed of a plurality of spaced, substantially parallel layers of a sheet material, particularly alternating layers of a corrugated sheet material and a flat sheet material. In the latter case, the corrugations are generally parallel and provide a plurality of axially extending passageways extending along the depth of the wheel. Such devices are disclosed in U.S. Pat. No. 4,769,053 and U.S. Pat. No. 5,542,968. Different materials have been proposed for the matrix construction including aluminium and fibrous materials. Considerable attention has also been given to the optimised use of the desiccant coatings. Nevertheless, one particular disadvantage of such wheels is their overall bulk. This is generally related to the volume of material required for effective heat exchange and to the need for an effective flow through area that will not lead to significant pressure drop and an associated high power consumption by the fan.

Many other forms of heat exchange construction have been proposed in the past for various different purposes. U.S. Pat. No. 4,147,210 discloses a screen heat exchanger comprising alternating screens and spacers. The screens are made of a conductive material such as copper or aluminium in the form of a mesh.

It would therefore be desirable to improve on the existing designs, not least in terms of matrix volume for a given performance but also in terms of the energy efficiency of flow through the device.

BRIEF SUMMARY OF THE INVENTION

According to the invention there is provided a heat exchange matrix defining a flow channel and comprising a plurality of generally planar foils comprising a water retaining material, arranged in spaced, substantially parallel relationship, each foil defining a main plane having a flow direction and a transverse direction, wherein the foils comprise strips that extend a strip length in the transverse direction and are separated from each neighbouring strip in the flow direction and each strip is offset from the main plane by a distance that is different from that of its neighbour. The resulting matrix is believed to achieve considerably higher heat exchange capacity per unit volume and is furthermore believed to have a greater efficiency in terms of flow resistance at the air speeds generally encountered in HVAC applications. In the present context, spaced relation is understood merely that the main planes of each foil are spaced from one another. The strips of adjacent foils may thus enter into contact with one another and may thus assist in achieving the spacing function. Furthermore, although reference is given to planar foils this may be understood to refer to their local disposition and is not intended to be limiting on the overall shape of the matrix, which may be adapted in use to any appropriate shape. In general however the foils will be flat at least in the flow direction and flat or curved in the transverse direction as will be described below.

Although various configurations and orientations of the strips may be considered, nevertheless, in general the strips will lie generally parallel to the flow direction. Without wishing to be bound by theory, it is believed that a disposition of all or most of the strips to lie in the direction of the flow is advantageous in reducing the pressure drop across the heat exchanger.

According to the present invention, the heat exchange matrix may form a single flow channel. This is understood to mean that although spacers may be present, they do not divide the flow into hermetically isolated streams. Furthermore, the flow channel defined by the matrix has a flow width in the transverse direction of at least a plurality of strip lengths.

Although the principle is believed to be applicable to foils having strips offset to two different positions, the device is believed to offer enhanced performance when the strips are offset from the main plane to at least four different positions. For the avoidance of doubt, in the present context the zero offset position is also considered one position representing a strip that lies in the main plane of the foil. The provision of strips offset to a plurality of positions is believed to be particularly advantageous in the case of evaporative cooling. As will be discussed in greater detail below it is believed that the provision of strips in a plurality of offset positions reduces the build up of a laminar boundary layer within an air stream flowing past the strips. By reducing such layer a better uptake of water from the surfaces of the strips is achieved and this in turn leads to more efficient evaporative cooling.

Preferably, the strips are offset to positions both above and below the main plane allowing for a balanced distribution of material. This may be of importance in a manufacturing procedure in reducing distortion. In this context too it has been found convenient that strips may be partially offset to a first position and partially offset to a second position. In this manner, the lengths of the strips in a given row of strips may be tailored to all be the same as one another. In this context a distinction may be made between the length and the absolute length of a strip. The absolute length of a strip is measured as the distance along the contour of the strip between the points at which the strip is connected to the foil. The length may be the direct distance between these two points. In a preferred embodiment the length of each strip is around 10 mm while the absolute length may be around 12 mm. By forming each of the fins with the same absolute length, distortions in the plate due to forming of the fins in the plate can be at least partially avoided.

In order to optimise the flow characteristics each strip is preferably spaced in the flow direction from a subsequent strip having the same offset by at least three times the strip width, more preferably at least five times this width. While not wishing to be bound by theory, it is believed that the flow is repeatedly interrupted by each strip and the limited length of the strip in the flow direction limits the build up of the boundary layer. In line with this theory, the strips are arranged in the matrix with each strip having a carefully chosen position with respect to its neighbours. The position of each strip within the matrix is chosen taking into account the following considerations.

It is believed that as a flow of media, for example gas, passes over a strip, a boundary layer is gradually created within the flow at the strip's surface, this creates what is known as laminar flow. Since the velocity within this boundary layer is smaller than outside, it acts as an insulating layer reducing thermal transfer between the main body of the media and the strip. The result is a reduction in thermal transfer as the medium flows along the length of the strip. In the case of an evaporative cooler, this boundary layer is believed to produce a layer of high humidity air over the strip surface. This layer has a reduced ability to take up water because of its high humidity. It also prevents the less humid air from the main body of the air stream reaching the strip surface for further water uptake. The same may be the case in reverse for heat recovery wheels and like devices. In that case, the boundary layer may prevent moisture in the air flow coming into good contact with the matrix material and its desiccant coating. The presence of such a boundary layer is therefore disadvantageous because it reduces water uptake in evaporative coolers and prevents moisture adsorption in desiccant devices.

To reduce the build up of laminar flow in the heat exchanger due to the creation of a boundary layer at the strip surfaces, the strips are limited in length in the flow direction. In theory, the strip should be no longer than the length required for a boundary layer to grow to its full thickness at the strip surface. Once the air or media flow is beyond the strip the laminar flow gradually reverts to turbulent flow. Taking this into consideration, strips which are in line in the flow direction are suitably spaced such that by the time the media reaches the leading edge of a downstream strip the laminar flow created by an upstream strip has sufficiently reverted to turbulent flow so that good thermal transfer can again take place. Likewise, this downstream strip is limited in length in the flow direction and is sufficiently spaced from a further downstream strip so that turbulent flow is re-established before the media reaches the next downstream strip. In this manner, laminar, insulating flow is sufficiently avoided and good thermal transfer between the media and strips is obtained and/or a good uptake of water from the strip surface is achieved. According to a preferred form of the invention, the strips have a width of between 1 mm and 5 mm, preferably between 1.5 mm and 3.0 mm. In a working embodiment the strips have a width of about 2.0 mm. In general, all of the strips will be of the same width although this need not be the case and strips of varying widths may be used e.g. in different zones of the matrix.

According to a further preferred embodiment, the pitch, that is the distance between the front edge of one strip and the front edge of an immediately following strip in the flow direction, is at least three times the strip width. More preferably it may be at least five strip widths.

In addition to the above consideration, the closest strips in an adjacent foil should be sufficiently spaced to avoid excessive interference between the boundary layers of these closest strips. Using these considerations, a matrix of foils with strips may be stacked together whereby rows of strips are sufficiently spaced in the flow direction to avoid laminar flow and closest strips in adjacent layers are sufficiently spaced in the direction perpendicular to the flow direction to avoid excessive boundary layer interference.

In one embodiment of the matrix, a plurality of spacers may be located between adjacent foils to maintain their spaced relation. The spacers may also provide additional functionality such as rigidity, mutual attachment of the layers, separation into flow channels or regions and liquid supply. Nevertheless, according to an important aspect of the invention, the foils may be stacked or rolled together without the use of spacers. In this case, the offset of the individual strips may be sufficient to keep the foils apart.

In a further embodiment of the invention, the strips are arranged in a plurality of rows extending in the flow direction, each row being separated from an adjacent row by a strip free zone. The strip free zone may ensure a degree of stability of the foil to the extent that it defines a continuous piece of foil that is neither cut nor otherwise deformed. The strip free zone may also serve as a location for spacers.

According to an important aspect of the invention, the strips are provided with a water retaining surface, preferably on both surfaces thereof. Water retaining elements as part of the strip surface, such as a roughened surface, may be achieved by etching or similar surface treatment of the strips to make them more hydrophilic in nature.

The water retaining surface may alternatively be a separate layer, which is for instance coated or adhered onto the strips. In this aspect, strips for use for humidification or adiabatic cooling may be distinguished from those used in indirect evaporative cooling. In the latter case, it was generally believed necessary to have certain areas of the heat exchange surface free from any covering in order to facilitate direct heat transfer. In the former case, complete coverage of the strips may be preferred. Cementitious materials such as Portland cement have in the past been found highly desirable for use as water retaining layers. Alternatively, fibre materials may be used.

In a preferred embodiment a flexible water retaining surface is provided on the foil in the form of a laminate. By providing a flexible water retaining surface, desired properties such as the spatial distribution of the liquid retaining surface, can be imparted to the foil prior to forming. The strips may then be conveniently formed into the desired shape. In a desirable embodiment, the water retaining layer has an open structure such that in use, a heat exchange medium can directly contact the strip surface through the open structure of the water retaining layer. By this means, the ability of the heat exchanger to transfer both thermal heat and latent heat to a fluid medium flowing over it is enhanced. The open structure may comprise spaces between the fibres of a fibrous material forming the water retaining layer. Such a fibrous material may be a woven or non-woven layer having an open structure.

The fibrous material may be attached to the foil or strips by adhesives or other similar methods. Preferably, the adhesive and the fibrous material should be such that delaminating does not take place on forming of the foil into a desired shape. Where adhesive is used, the adhesive may be chosen to enhance the properties of the strip or water retaining layer. Thus the adhesive may be chosen to have water-retaining properties or heat conducting properties, or both and may thus be considered to form a part of either of these layers.

A preferred embodiment of the invention has a water retaining surface comprising material which has been printed, sprayed or transferred onto the strips. This printed material may be hydrophilic in order to retain the water or may be provided in a pattern that acts to retain water by surface tension or capillary action. Such a pattern may for instance comprise isolated regions of material, the isolated regions being spaced by a distance that allows water retention while leaving portions of the underlying strip open to the air stream. In place of or in addition to isolated regions of material, interlinked regions providing the desired water retention may also be provided. Printing a material onto the strip surfaces may take place by inkjet printing.

According to one particular embodiment of the invention, the foil comprises a layer of aluminium. In fact the foil may be predominantly aluminium e.g. covered with water retaining layers on both of its surfaces. The foil may have a thickness of between 50 and 300 microns, preferably between 75 and 150 microns. For an aluminium based foil, a thickness of aluminium material of around 70 microns has been found sufficient to provide optimal strength and stability for the strips. If aluminium is used, it may be desirably coated with suitable lacquers to prevent corrosion. It will be understood that although aluminium offers advantages in terms of manufacture it may not necessarily be required for the purpose of heat conduction. For instance, other materials may also be employed to form the matrix, in particular plastics and non-metallic materials.

Most preferably the heat exchange matrix according to the invention comprises a plurality of foils of similar dimensions stacked together to form a block like structure. Alternatively, it may comprise one or more foils wound together to form a cylindrical or annular structure. The exact form will depend upon the intended use and on manufacturing considerations, nevertheless, it has been found that a dimension in the flow direction of around 100 mm is sufficient for most HVAC purposes. Furthermore, the density of the foils may be set such that an overall surface area of the matrix of between 500 $m^2/m^3$ and 800 $m^2/m^3$ is achieved, preferably round 650 $m^2/m^3$. In this preferred construction, the spacing between adjacent foils is around 2.0 mm but it may generally be between 1 mm and 5 mm, preferably between 1.5 mm and 3.0 mm.

The invention also relates to a heat exchange foil for forming such a matrix. The foil comprising strips that each extend a strip length in the transverse direction and are separated from each neighbouring strip in the flow direction whereby each strip is offset from the main plane by a distance that is different from that of its neighbour. Such a foil has been found highly versatile in forming heat exchange matrixes in various forms and configurations.

The invention further relates to a method of manufacturing such a heat exchange matrix or foil, comprising: providing a supply of foil material having water retaining first and second surfaces; passing the foil material through a cutting station to cut the foil to form a plurality of strips, each strip having a strip length defining a transverse direction and each strip being separated by the cut from each neighbouring strip in a flow direction; and passing the cut foil through a forming station to offset each strip from a main plane of the foil by a distance that is different from that of its neighbour.

The method is particularly applicable for soft annealed aluminium foil which exhibits the necessary stability and strength and can easily be cut and formed in the described manner. Preferably the foil has a thickness of between 50 and 300 microns, preferably between 75 and 150 microns, including any coatings or water retaining provisions.

According to the inventive method, the foil is fed in the transverse direction through rollers embodying the cutting station and the forming station. Thereafter, the worked foil may be formed into a matrix by separating sections of foil and stacking the sections to form a stack having multiple layers. Alternatively, the foil may be rolled to form a roll having multiple layers. Spacers may be inserted as required between the multiple layers to maintain their respective spacings or otherwise improve stability.

According to a still further aspect of the invention, an evaporative cooler, adiabatic cooler or humidification unit may comprise such a heat exchange matrix as described above, retained in a housing having at least an air inlet, an air outlet and a fan arrangement for directing air through the matrix in the flow direction. Additionally there may be provided a source of water for wetting the matrix. The device may also be used for air washing or otherwise removing odours, dust and other undesirable substances from a flow of air. In a preferred form, embodied as an adiabatic cooler comprising a source of water for wetting the matrix, the strips extend generally vertically and the flow channel extends generally horizontally, the source of water being arranged to supply water to an upper side of the plurality of foils such that the water can flow downwards along the strips. Such a configuration allows optimal distribution of the water down and through the matrix. In particular, in this configuration, spacers provided to maintain a distance between adjacent foils should not extend in the flow direction as this would impede the downward flow of water. Preferably, spacing is provided by small spots or blobs of adhesive or suitable polymer between adjacent foils. The spots may have a maximum dimension of around 1 cm.

According to an alternative aspect, a heat recovery wheel may comprise such a heat exchange matrix in the form of a rolled foil, the wheel having an axis aligned with the flow direction and further comprising a fan arrangement for passing an airflow in the axial direction through the matrix, whereby the strips are provided on their surface with a desiccant material. In this context, it is noted that a desiccant material is distinct from a material that is only water retaining in that it can retain water through additional hygroscopic or chemical mechanisms. A distinction may therefore be made with water retaining non-desiccant materials which retain water merely by physical or surface tension phenomena.

BRIEF DESCRIPTION OF THE DRAWINGS

The features and advantages of the invention will be appreciated upon reference to the following drawings of a number of exemplary embodiments, in which.

DESCRIPTION OF ILLUSTRATIVE EMBODIMENTS

Figure 1:
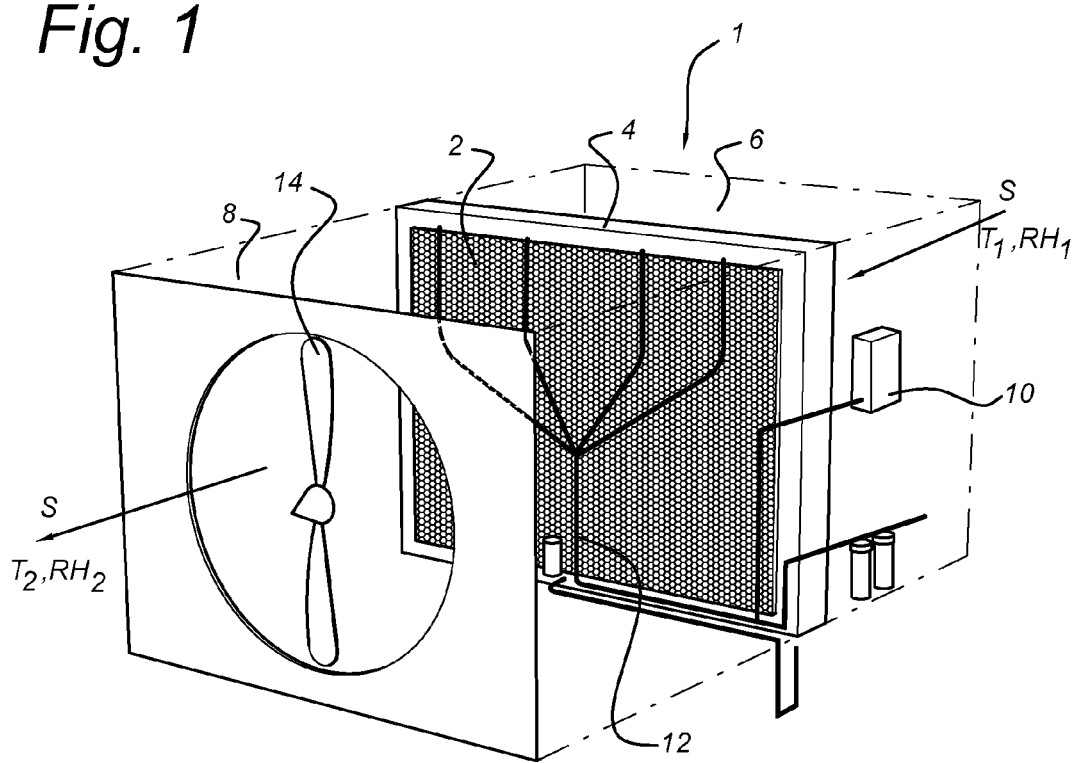
FIG. 1 shows a conventional adiabatic humidifier.

FIG. 1 shows an arrangement of a conventional adiabatic humidifier 1 arranged to introduce moisture into an airstream S. The humidifier comprises a heat exchange matrix 2 supported by a housing 4 forming an inlet 6 and an outlet 8 for the airstream S. Furthermore there is provided a controller 10, a water supply 12 and a fan 14.

Figure 2:
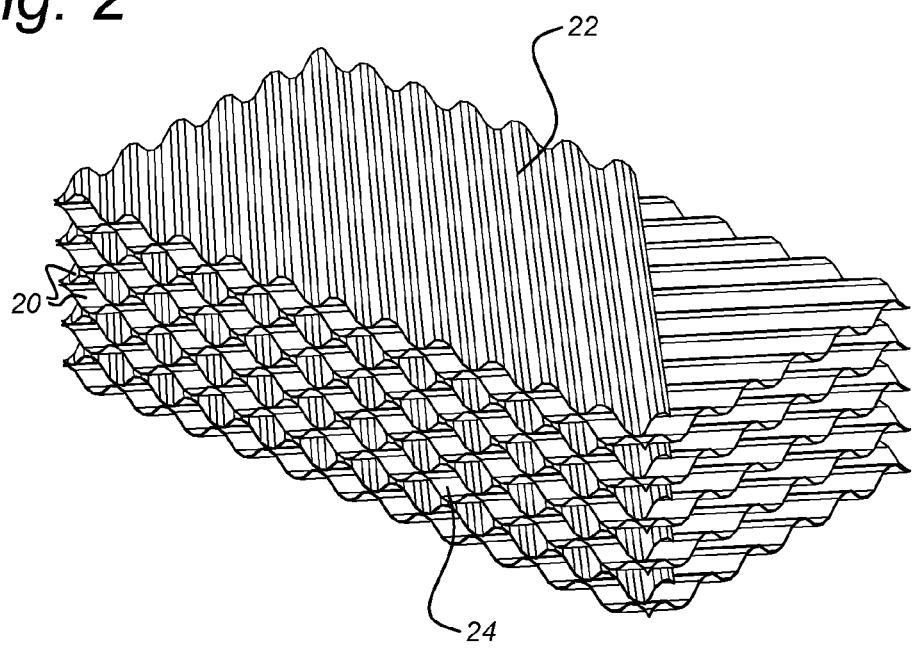
FIG. 2 shows a close-up view of part of the device of FIG. 1.

FIG. 2 shows a close up of a section of the heat exchange matrix 2. It comprises a plurality of layers 20 of corrugated material comprising resin impregnated cellulose fibres. The layers 20 are stacked together whereby corrugations 22 in adjacent layers cross each other at an angle forming flow passages 24. The pitch of the corrugations is around 25 mm.

A humidifier 1 as shown in FIG. 1 and FIG. 2 may be used to cool relatively dry, warm air to close to its wet-bulb temperature. In use, the airstream S to be cooled is supplied to the inlet 6. At this stage, the air may have a temperature T1 and has low relative humidity RH1. Water is supplied to the matrix 2 by the water supply 12 causing the fibre material of the layers 20 to take up moisture. As the airstream S passes through the flow passages 24 it entrains moisture from the surfaces of the layers 20 which evaporates into the airstream S. In doing so, the temperature of the air is reduced and its relative humidity increases accordingly. The airstream exits the matrix 2 with a temperature T2 and a relative humidity RH2. If sufficient water vapour is evaporated, the air will arrive at its wet bulb temperature and will be fully saturated with a relative humidity of 100%. Although not shown, a droplet eliminator may be located downstream of the matrix 2 in order to remove fine water droplets that may otherwise be entrained by the airstream S.

Conventional humidifiers as described above are relatively voluminous. In order to achieve maximum humidification, the length in the flow direction is generally between 200 mm and 300 mm, depending on the typical inlet air humidity conditions. The frontal area required is dependent upon the desired capacity, requiring around 0.14 m² for each 1000 m³/h.

Figure 3:
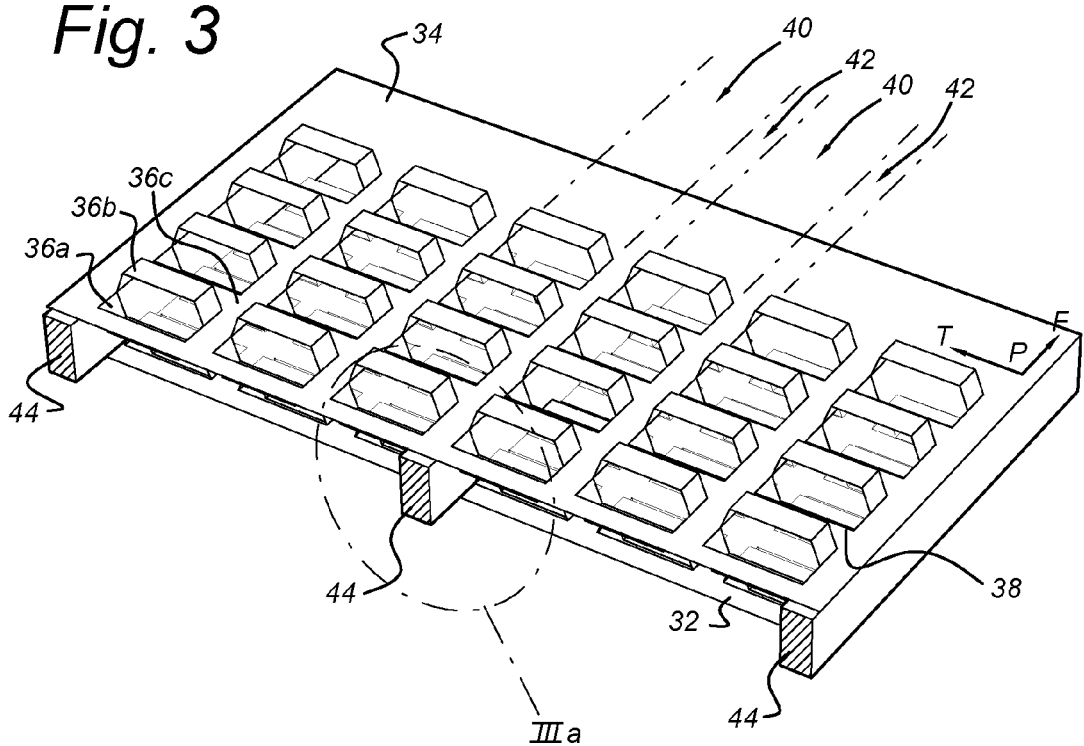
FIG. 3 shows a portion of a heat exchange matrix according to the present invention.

FIG. 3 shows a portion of a heat exchange matrix 30 according to the present invention. The matrix comprises a first foil 32 and a second foil 34. The foils 32, 34 each define a main plane P having a flow direction F and a transverse direction T. For the sake of the following description, an undeformed edge region of the foils will be taken as the datum level for the main plane P. Each foil is divided into strips 36 which are partially separated from the foils 32, 34 by cuts 38 and which are offset from the main plane by an offset distance d.

Figure 3A:
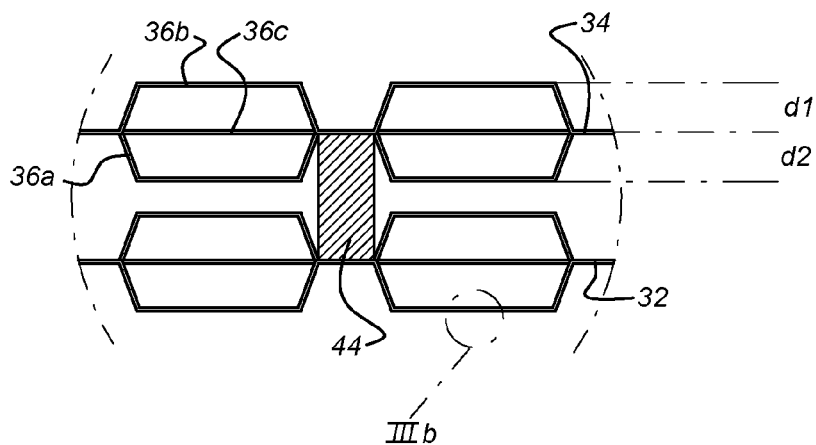
FIG. 3A shows a detailed view of part of the matrix of FIG. 3.

In the embodiment of FIG. 3, strips 36 are located in a plurality of rows 40 aligned in the flow direction F. Consecutive strips in a row 40 are designated as 36a, 36b and 36c. FIG. 3A shows a view of the matrix 30 of FIG. 3, taken in the direction A. As may be seen, the strips 36 are offset to three different positions, namely the zero position (lying in the plane P) and to a distance d1 above the plane and a distance d2 below the plane. Each strip 36 is thus separated from a neighbouring strip in the flow direction F and offset from the main plane P by a distance that is different from that of its neighbour.

Between each row 40 there is located a strip free zone 42 which is also at the level of the main plane P. Spacers 44 are located in strip free zones 42, in this case in the centre and at the edges of the matrix. Spacers 44 serve to keep the foils 32 and 34 at a distance from one another. In the present embodiment, the distance d1 is 2.0 mm as is the distance d2. The separation of the foils 32, 34 is 6.0 mm. Furthermore, the width w of each strip 36 measured in the flow direction F is 2.0 mm and the length l of the strips 36 is 10 mm.

Figure 3B:
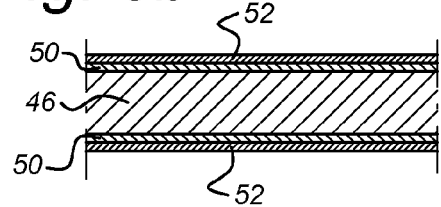
FIG. 3B shows a cross sectional view taken at position IIIb in FIG. 3A.

FIG. 3B shows a cross sectional view of the material of the foil 32 taken at position B in FIG. 3. Although foil 32 is described, it will be understood that foil 34 is substantially identical. The foil 32 comprises a primary layer 46 of soft annealed aluminium having a thickness of 70 micron. On each surface, the primary layer 48 is coated with a protective layer 50 of PVC primer or the like. Protective layer 50 is also heat sealable and can be used to join foil portions together or to other elements during construction if so required. The outermost layer on both surfaces of the foil 32 is a water retaining layer 52. It is noted that the thickness of these layers is shown schematically and they may in actual fact vary considerably relative to one another.

An important factor for the efficient operation of an evaporative cooler is the nature of the water retaining layer 52. Although reference is made to a water retaining layer, it is clearly understood that the layer is in fact a water retaining and releasing layer, without chemically binding it. A requirement of such a layer is that it easily gives up its water such that minimal resistance to evaporation is encountered. It is also important that it should distribute water quickly and effectively to all relevant surfaces. It should thus be hydrophilic without being hygroscopic, preferably retaining water primarily by surface tension effects.

In the present embodiment, the water retaining layer 52 is formed from a fibrous material. An exemplary material for forming the water retaining layer 30 is a 20 g/m² polyester/viscose 50/50 blend, available from Lantor B.V. in The Netherlands. Another exemplary material is a 30 g/m² polyamide coated polyester fibre available under the name Colback™ from Colbond N.V. in The Netherlands. Other materials having similar properties including synthetic and natural fibres such as wool may also be used. Where necessary, the water retaining layer 52 may be coated or otherwise treated to provide anti bacterial or other anti fouling properties.

The water retaining layer 52 is adhesively attached to the protective layer 50 using a 2 micron layer of two-component polyurethane adhesive. The resulting laminate has been found ideal for the purposes of manufacturing since it can be formed and cut into the desired shape in a continuous process without substantial delamination. Other water retaining layers such as Portland cement may also be used and have in fact been found to provide superior properties although as yet, their production is more complex since there is a tendency to crack or flake if applied prior to forming of the matrix. It is nevertheless believed that other surface finishes and treatments such as aluminium oxide may themselves be adequate for providing the water retention and wicking required.

In use, the matrix 30 may be provided in a block comprising multiple layers and may be located in a housing 4 as described in relation to FIG. 1, taking the place of the conventional matrix 2. According to the invention, the overall size of the housing for a given cooling and airflow may be reduced or alternatively, for a housing of the same size considerably greater air flow may be provided.

Figure 4:
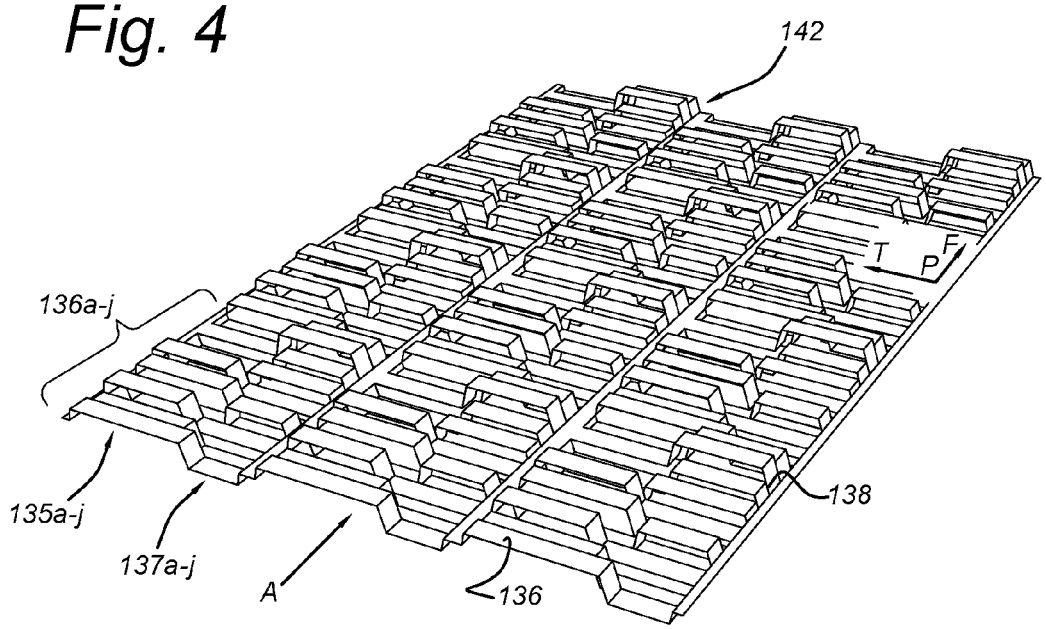
FIG. 4 shows a foil according to a second embodiment of the invention.

FIG. 4 shows a second embodiment of the invention in which like numerals preceded with 100 are used to designate similar elements to those of the first embodiment. Foil 132 defines a main plane P having a flow direction F and a transverse direction T. In this embodiment, the foil 132 is divided into strips 136A-J separated from each other in the flow direction F by cuts 138 and from adjacent strips 136 in the transverse direction T by strip free zones 142. Each strip 136 has a corrugated contour comprising a first portion 135A-J offset to one side of the plane P and a second portion 137A-J being offset to the opposite side of the plane or being in the plane itself (zero offset). In all, the strip portions 135, 137 are offset to 9 different positions with respect to the main plane P. Each strip portion 135, 137 is offset to a different position relative to a neighbouring strip portion 135, 137 in the flow direction F. The strip material is the same as described in relation to FIG. 3.

Figure 4A:
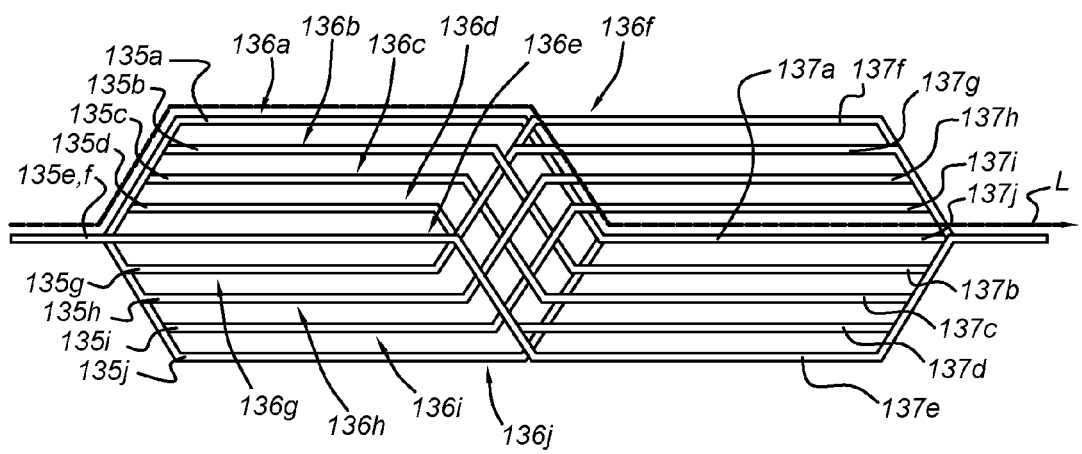
FIG. 4A shows a partial view of the foil of FIG. 4 taken in the direction of arrow A.

FIG. 4A shows a partial view of a portion of the foil 132 of FIG. 4 taken in the direction of arrow A, in which the different strip portions 135A-J, 137A-J can be clearly seen. As a result of the strip portions 135, 137 being offset to different positions, it may be achieved that each of the strips 136 has the same absolute length L as measured along its contour. This has the advantage that when the strips 136 are cut from a continuous foil, there will be relatively little overall deformation of the foil and strip free zones 142 will lie in a straight line.

Figure 5:
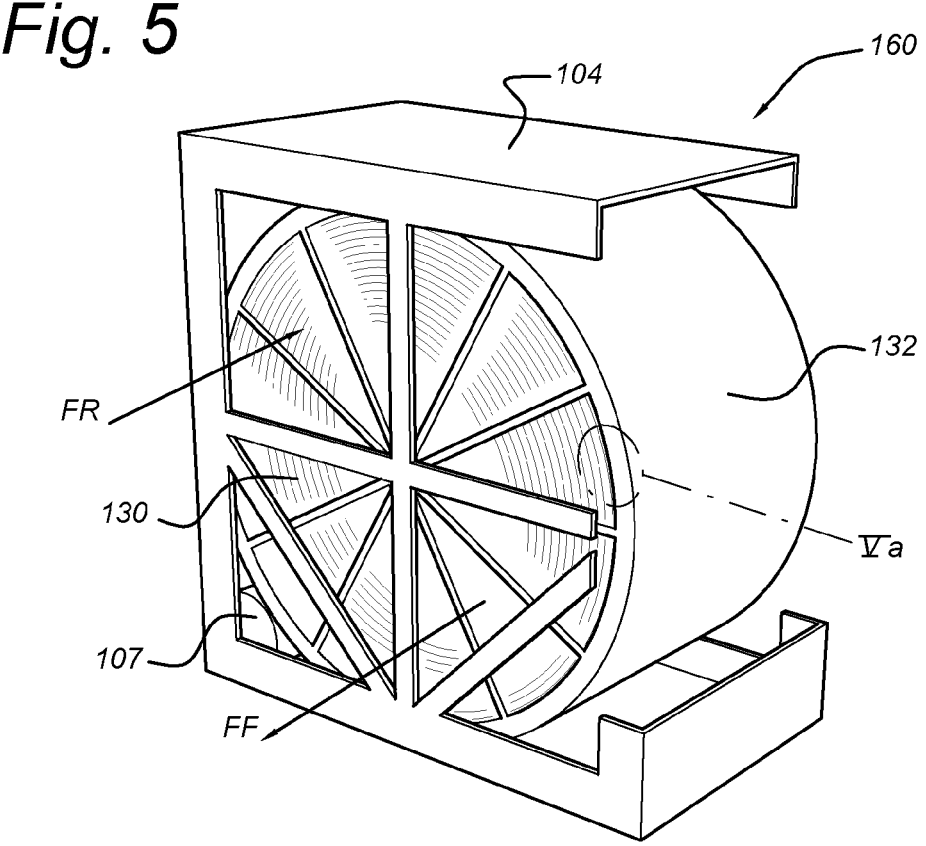
FIG. 5 shows an embodiment of the invention in the form of a heat recovery wheel.

FIG. 5 discloses an embodiment of the invention where the foil 132 is given the form of a heat recovery wheel 160. The foil 132 is rolled up in a continuous fashion to form a matrix 130 in the shape of a roll. The matrix 130 is supported within a housing 104 for rotation by a motor 107. Flow takes place through the wheel in both forward $F_F$ and reverse directions $F_R$.

Figure 5A:
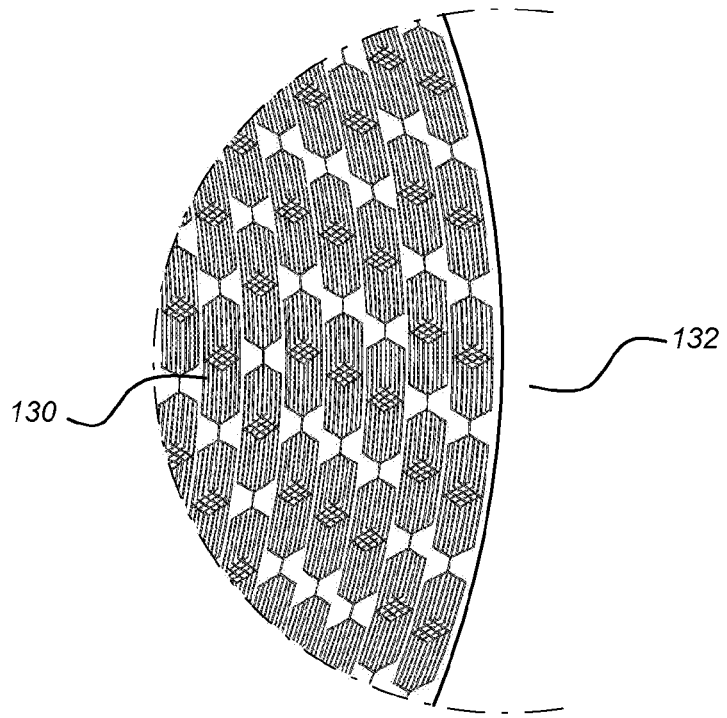
FIG. 5A shows a partial view of the matrix of FIG. 5.

FIG. 5A shows a partial view of the matrix 130 of FIG. 5. In this embodiment, the consecutive layers of the foil 132 lie on top of each other without spacers in between. Due to the numerous different offsets of the strip portions 135, 137 the foils 132 are effectively spaced from each other by the interaction of strip portions of the neighbouring layers. It may also be noted that the strip free zones 142 do not lie above each other whereby the strip free zone in each adjacent layer forms a partial channel for air flow.

Furthermore, in the embodiment of FIG. 5A the water retaining layer (not shown) is a desiccant coating of the type generally used for desiccant wheels. This layer may be for instance an X-type or Y-type zeolite, silica, alumina or blends thereof having modified isothermal behaviour or any other suitable material as described for this purpose in U.S. Pat. No. 5,860,284, the contents of which are incorporated herein by reference in their entirety. In use the wheel 160 of FIG. 5, may operate in the same manner as a conventional desiccant wheel with the advantage of a relatively lower pressure drop for a given size of wheel 160 and flow rate.

Figure 6:
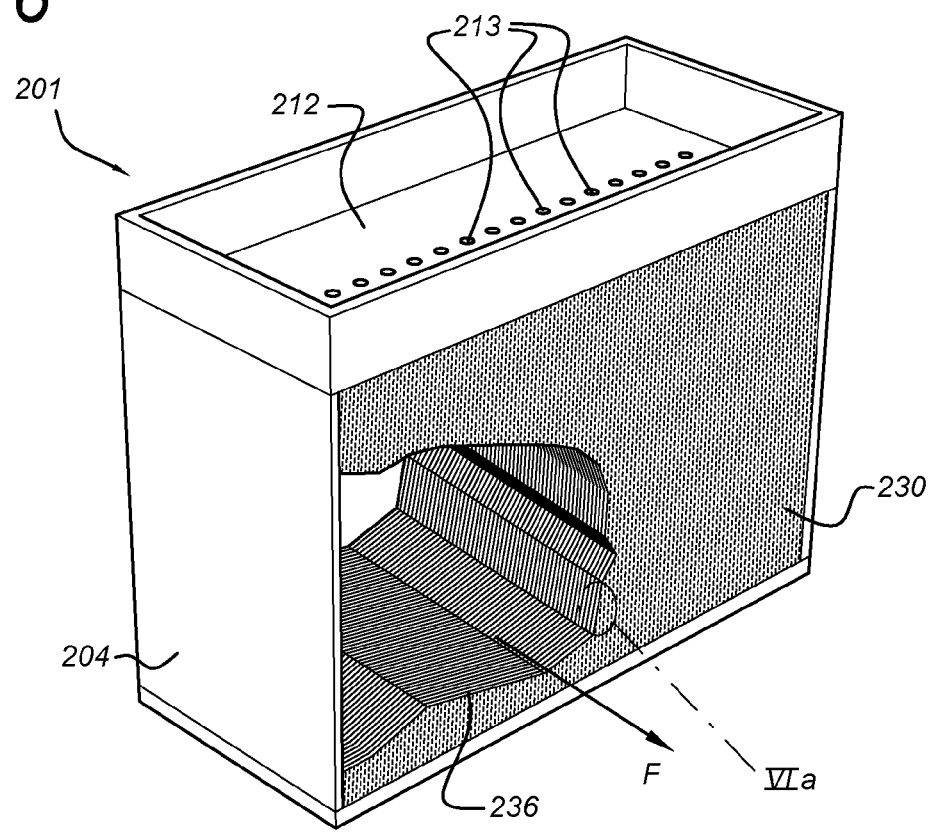
FIG. 6 shows an embodiment of the invention as an adiabatic cooler element.
Figure 6A:
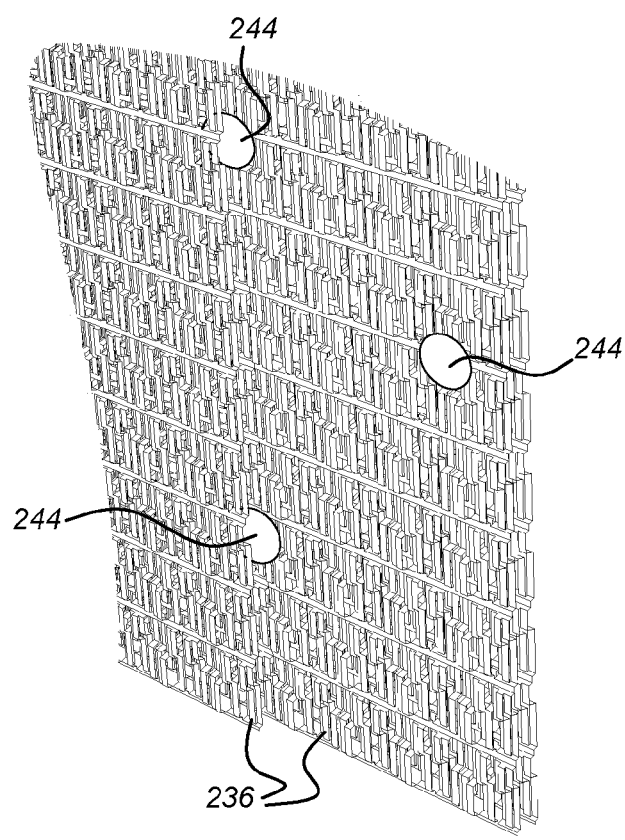
FIG. 6A shows a partial view of the matrix of FIG. 6.

FIG. 6 shows an embodiment of the invention as an adiabatic cooler element 201 comprising a matrix 230 as described above retained by a housing 204. A water distribution channel 212 along the top side of the element 201 supplies water through holes 213 which flows downwards along the strips 236. The water may be supplied to the channel 212 by a pump or other suitable system. Air flow in the flow direction F assists in transporting the water through the matrix 230. Additionally, the presence of the water retaining layer covering the foils 232 encourages wicking of the water to all regions of the matrix 230. The foils 232 are spaced from each other by spots of spacing material 244 comprising a PU adhesive foam.

EXAMPLE

A matrix as described above according to FIG. 4 was constructed and tested. Similar tests were carried out on a conventional matrix material CELDEK™ 5090-15 available from Munters AB. It is noted that the surface area of material per unit volume is comparable for both material. The tests were carried out according to Australian Standard (AS 2913-2000) whereby the supply air has a dry bulb temperature of 38° C. and a wet bulb temperature of 21° C. (21% relative humidity). The saturation efficiency is the actual temperature reduction of the supply air (T in–T out) with respect to the temperature drop that would be required to reach the wet bulb temperature (T wb in).

Saturation efficiency=($T$ in–$T$ out)/($T$ in–$T$ wb in).

The results given in Table 1 below show:

For the same flow rate and the same volume as the example, the comparative material has a 9% lower Wet Bulb Efficiency and an 89% higher pressure drop;

If the length of the comparative material is increased in order to achieve the same efficiency at the same flow rate as the example, 44% more material is require and the pressure drop will be 164% higher;

With the same length as the example, the flow rate for the comparative material must be reduced to around 1.8 m/s in order to achieve the same pressure drop. For this 39% more material volume is required and the Wet Bulb Efficiency is 6% lower;

If the length of the comparative material is increased and the flow rate adjusted such that the pressure drop and wet bulb efficiency are comparable to that of the example, 122% more material volume is required.

TABLE 1

| | Length mm | Flow rate m/s | Relative volume % | Wet Bulb Efficiency % | Pressure Drop Pa | Surface area/vol $m^2/m^3$ |
|---|---|---|---|---|---|---|
| Example | 90 | 2.5 | 100 | 90 | 53 | 652 |
| comparative material -same length and flow rate | 90 | 2.5 | 100 | 81 | 100 | 588 |
| comparative material -same efficiency and flow rate | 130 | 2.5 | 144 | 90 | 140 | 588 |
| comparative material -same length and P drop | 90 | 1.8 | 139 | 84 | 53 | 588 |
| comparative material -same efficiency and P drop | 120 | 1.5 | 222 | 90 | 53 | 588 |

Thus, the invention has been described by reference to certain embodiments as discussed above. It will be recognized that these embodiments are susceptible to various modifications and alternative forms well known to those of skill in the art.

Many modifications in addition to those described above may be made to the structures and techniques described herein without departing from the spirit and scope of the invention. Accordingly, although specific embodiments have been described, these are examples only and are not limiting upon the scope of the invention.

The invention claimed is:

1. An evaporative cooler, adiabatic cooler or humidification unit comprising:
a heat exchange matrix defining a single flow channel and comprising a plurality of generally planar foils comprising a water retaining material, arranged in spaced, substantially parallel relationship and a plurality of spacers located between adjacent foils to maintain their spaced relation, each foil defining a main plane having a flow direction and a transverse direction, wherein the foils comprise strips that extend a strip length in the transverse direction and are separated from each neighbouring strip in the flow direction and each strip is offset from the main plane by a distance that is different from that of its neighbour,
a housing having at least an air inlet, an air outlet, the matrix being located in the housing;
a fan arrangement for directing air through the matrix in the flow direction; and
a source of water for wetting the matrix.

2. The device according to claim 1, wherein the strips are offset to positions both above and below the main plane, preferably to at least four different positions.

3. The device according to claim 1, wherein the strips are generally parallel to the main plane.

4. The device according claim 1, wherein each strip is partially offset to a first position and partially offset to a second position.

5. The device according to claim 1, wherein each strip has a width in the flow direction and a first strip is spaced in the flow direction from a subsequent strip having the same offset by at least three times the width, more preferably at least five times the width.

6. The device according to claim 1, wherein the strips are arranged in a plurality of rows extending in the flow direction, each row being separated from an adjacent row by a strip free zone.

7. The device according to claim 6, wherein the spacers extend along the strip free zones.

8. The device according to claim 1, wherein the water retaining material comprises a water retaining layer applied to the strips, preferably on both surfaces thereof.

9. The device according to claim 1, wherein the strips have a width of between 1 mm and 5 mm, preferably between 1.5 mm and 3.0 mm.

10. The device according to claim 1, wherein the foil has a thickness of between 50 and 300 microns, preferably between 75 and 150 microns.

11. The device according to claim 1, wherein the foil comprises a layer of aluminium.

12. The device according to claim 1, wherein the heat exchange matrix comprises a plurality of foils of similar dimensions stacked together to form a block like structure.

13. The device according to claim 1, wherein the heat exchange matrix comprises one or more foils wound together to form a cylindrical or annular structure.

14. The device according to claim 1, wherein a spacing between adjacent foils is between 1 mm and 5 mm, preferably between 1.5 mm and 3.0 mm.

15. A method of manufacturing a device according to claim 1, comprising:
providing a supply of foil material having water retaining first and second surfaces;
passing the foil material through a cutting station to cut the foil to form a plurality of strips, each strip having a strip length defining a transverse direction and each strip being separated by the cut from each neighbouring strip in a flow direction;
passing the cut foil through a forming station to offset each strip from a main plane of the foil by a distance that is different from that of its neighbour;
separating sections of foil and stacking the sections to form a stack having multiple layers or rolling the foil to form a roll having multiple layers; and
inserting spacers between the multiple layers to maintain their respective spacings while maintaining a single channel.

16. The method of claim 15, wherein the foil comprises aluminium.

17. The method of claim 15, wherein the foil has a thickness of between 50 and 300 microns, preferably between 75 and 150 microns.

18. The method of claim 15, wherein the foil is fed in the transverse direction through rollers embodying the cutting station and the forming station.

19. An adiabatic cooler according to claim 1, wherein the strips extend generally vertically and the flow channel extends generally horizontally, the source of water being arranged to supply water to an upper side of the plurality of foils such that the water can flow downwards along the strips.

20. The adiabatic cooler according to claim 19, wherein the foils are spaced from each other by spacers having limited extent in the flow direction.

21. The adiabatic cooler according to claim 19, wherein the spacers comprise spots of polymeric material having a dimension in the main plane of the foils of less than 1 cm.

* * * * *